(12) United States Patent
Kim et al.

(10) Patent No.: US 8,328,407 B2
(45) Date of Patent: Dec. 11, 2012

(54) LIGHT GUIDE PLATE, DISPLAY APPARATUS HAVING THE SAME, AND METHOD OF MANUFACTURING THE SAME

(75) Inventors: Heugon Kim, Yongin-si (KR); Jin Seo, Osan-si (KR); Byung-Seo Yoon, Incheon (KR); Insun Hwang, Suwon-si (KR); Seki Park, Asan-si (KR); Seong-Yong Hwang, Asan-si (KR)

(73) Assignee: Samsung Display Co., Ltd., Yongin (KR)

( * ) Notice: Subject to any disclaimer, the term of this patent is extended or adjusted under 35 U.S.C. 154(b) by 244 days.

(21) Appl. No.: 12/877,445

(22) Filed: Sep. 8, 2010

(65) Prior Publication Data

US 2011/0157913 A1 Jun. 30, 2011

(30) Foreign Application Priority Data

Dec. 31, 2009 (KR) ........................ 10-2009-0135325

(51) Int. Cl.
*F21V 7/04* (2006.01)
(52) U.S. Cl. .................... 362/625; 362/620; 362/623
(58) Field of Classification Search .......... 362/617–620, 362/623–626
See application file for complete search history.

(56) References Cited

U.S. PATENT DOCUMENTS

| | | | | |
|---|---|---|---|---|
| 5,408,388 A | * | 4/1995 | Kobayashi et al. | 362/613 |
| 5,775,791 A | * | 7/1998 | Yoshikawa et al. | 362/625 |
| 7,441,936 B2 | * | 10/2008 | Liao | 362/626 |
| 2004/0076396 A1 | * | 4/2004 | Suga | 385/146 |
| 2004/0125589 A1 | | 7/2004 | Sung | |
| 2004/0263718 A1 | | 12/2004 | Tsai | |
| 2006/0133113 A1 | * | 6/2006 | Koike et al. | 362/626 |
| 2007/0070649 A1 | | 3/2007 | Won et al. | |
| 2008/0068863 A1 | | 3/2008 | Liao | |
| 2009/0109373 A1 | | 4/2009 | Taniguchi et al. | |
| 2010/0053997 A1 | | 3/2010 | Teng et al. | |

FOREIGN PATENT DOCUMENTS

| | | |
|---|---|---|
| JP | 07-049421 | 2/1995 |
| JP | 08-290596 | 11/1996 |
| JP | 11-015411 | 1/1999 |
| JP | 2002-022965 | 1/2002 |
| JP | 2003-043266 | 2/2003 |
| JP | 2004-247072 | 9/2004 |
| KR | 1020020078461 | 10/2002 |
| KR | 1020030021074 | 3/2003 |
| KR | 1020030042509 | 6/2003 |
| KR | 1020050070628 | 7/2005 |
| KR | 1020050074037 | 7/2005 |
| KR | 1020080093931 | 10/2008 |

* cited by examiner

*Primary Examiner* — Alan Cariaso
(74) *Attorney, Agent, or Firm* — H. C. Park & Associates, PLC

(57) ABSTRACT

A light guide plate includes an incident surface receiving incident light from a light source, an exit section that outputs exit light having a light distribution different from a light distribution of the incident light and a reflective section opposite to the exit section. A plurality of first patterns are formed on the exit section while being arranged in a first direction of the exit section to distribute the exit light with maximum brightness in a direction perpendicular to the exit section. A plurality of second patterns are formed on the reflective section to scatter the incident light.

15 Claims, 10 Drawing Sheets

(a)

(b)

(c)

(d)

(e)

(f)

(a)

(b)

(c)

(d)

(e)

(f)

LIGHT GUIDE PLATE, DISPLAY APPARATUS HAVING THE SAME, AND METHOD OF MANUFACTURING THE SAME

CROSS REFERENCE TO RELATED APPLICATION

This application claims priority from and the benefit of Korean Patent Application No. 2009-135325, filed on Dec. 31, 2009, which is hereby incorporated by reference for all purposes as if fully set forth herein.

BACKGROUND OF THE INVENTION

1. Field of the Invention

The present invention relates to a light guide plate, a display apparatus having the same, and a method of manufacturing the same. More particularly, the present invention relates to a light guide plate capable of improving display quality, a display apparatus having the same, and a method of manufacturing the same.

2. Discussion of the Background

A liquid crystal display (LCD) includes a display panel to display an image. Since the display panel has a non-emissive property, a light source is necessary to provide light to the display panel. In this regard, the LCD includes a backlight unit in addition to the display panel.

The backlight unit is classified into an edge-illumination type backlight unit and a direct-illumination type backlight unit according to the position of a light source. The light source is provided behind the display panel in the direct-illumination type backlight unit. The light source is provided at a side of the display panel in the edge-illumination type backlight unit.

Since the light source is provided with a point light source or a linear light source for the LCD, the backlight unit includes a light guide plate that guides the light from the light source into the display panel in order to efficiently supply light to the display panel. The light guide plate converts the light path to guide the light to the display panel.

SUMMARY OF THE INVENTION

The present invention provides a light guide plate capable of improving display quality.

The present invention also provides a display apparatus including such a light guide plate.

Additional features of the invention will be set forth in the description which follows, and in part will be apparent from the description, or may be learned by practice of the invention.

The present invention discloses a light guide plate including an incident surface to receive incident light from a light source, an exit section that outputs exit light having a light distribution different from a light distribution of the incident light, and a reflective section opposite to the exit section. A plurality of first patterns are formed on the exit section while being arranged in a first direction of the exit section to distribute the exit light with maximum brightness in a direction perpendicular to the exit section. In addition, a plurality of second patterns are formed on the reflective section to scatter the incident light.

The present invention also discloses the light guide plate is manufactured by forming a plurality of first patterns on the exit surface in a first direction perpendicular to the incident surface and printing a plurality of second patterns on the reflective section such that the second patterns have a first interval in the first direction and a second interval greater than the first interval in a second direction crossing the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
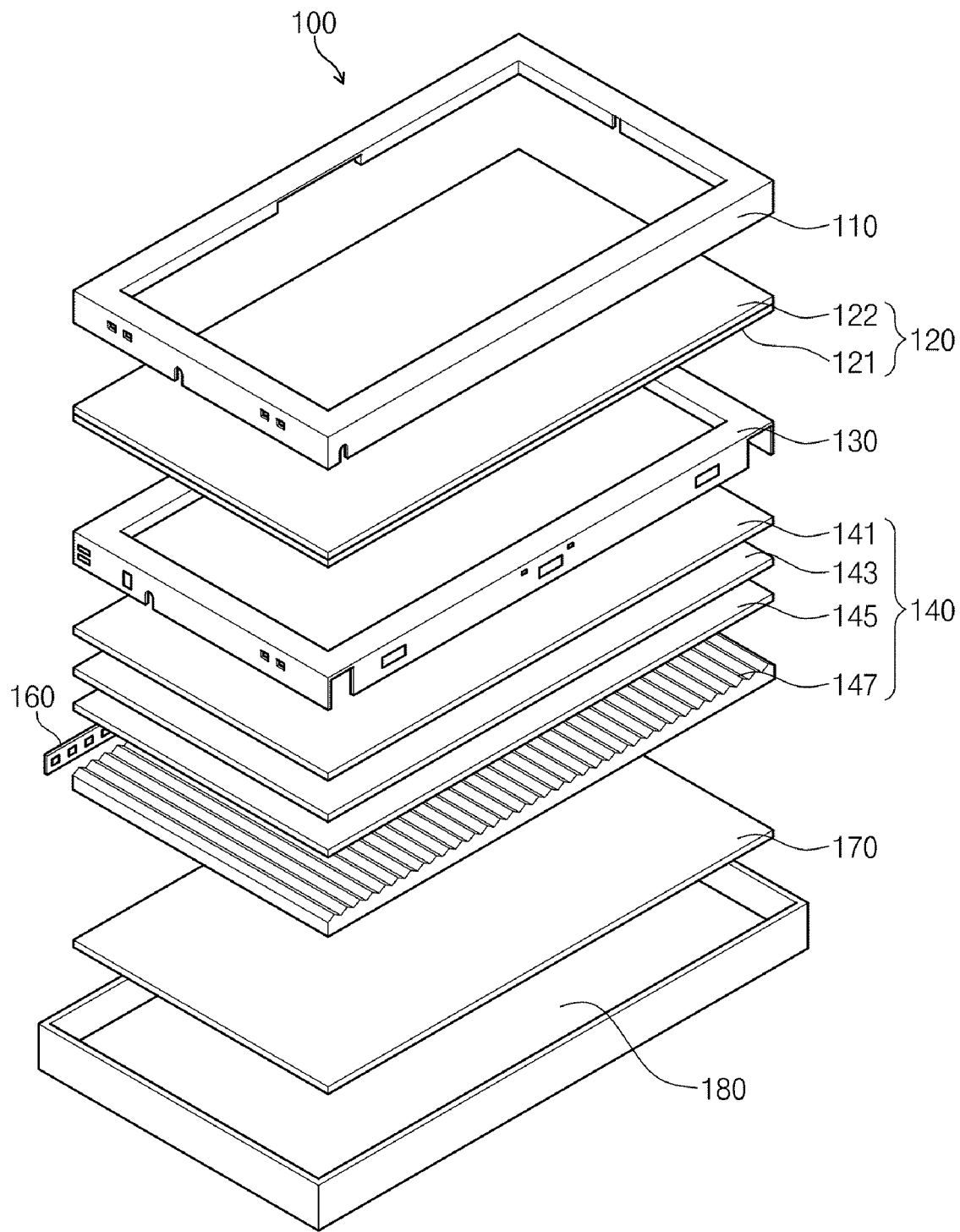
FIG. 1 is an exploded perspective view showing a display apparatus according to a first exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Hereinafter, a light guide plate and a display apparatus having the same according to the exemplary embodiments of the present invention will be described with reference to the accompanying drawings.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. For the purpose of explanation, a portion of a display panel on which an image is displayed will be referred to as an upper portion or a front portion, and a portion opposite to the upper portion or the front portion will be referred to as a lower portion or a rear portion.

FIG. 1 is an exploded perspective view showing a display apparatus according to the first exemplary embodiment of the present invention.

Referring to FIG. 1, the display apparatus 100 according to the first exemplary embodiment of the present invention includes a display panel 120, a mold frame 130, a back light unit including an optical member 140 and a light source 160, a reflective sheet 170, a lower cover 180 and an upper cover 110. The present embodiment employs an edge-illumination type backlight unit in which the light source 160 is placed at a side of the optical member 140.

The display panel 120 displays an image on a front surface thereof. The mold frame 130 is provided at a peripheral portion of the display panel 120 to support the display panel 120. The optical member 140 is provided below the mold frame 130, that is, behind the display panel 120. The light source 160 is provided at a side of the optical member 140 to supply light to the display panel 120 through the optical member 140. The reflective sheet 170 is provided below the light source 160 to reflect light, which is not directed to the display panel 120, toward the display panel 120. The lower cover 180 is provided below the reflective sheet 170 to receive the display panel 120, the optical member 140, the light source 160, and the reflective sheet 170. The upper cover 110 is provided above the display panel 120 such that the upper cover 110 is coupled with the lower cover 180. The upper cover 110 is a structure supporting a front peripheral surface of the display panel 120. The upper cover 110 includes a display window to expose a display region of the display panel 120. The upper cover 110 is provided at a side surface thereof with a coupling unit such as a screw hole (not shown) such that the upper cover 110 can be coupled with the lower cover 180.

Although not shown in the drawings, the display panel 120 may be provided at one side thereof with a printed circuit board connected with thin film transistors of the display panel 120. Signals generated from the printed circuit board are transmitted to the thin film transistors through interconnections. The thin film transistors apply voltages to pixels according to the signals, thereby driving liquid crystal.

Hereinafter, components of the display panel 120 will be described in detail.

Various display panels may be employed if they display an image. The display panels may include an LCD panel or an electrophoretic display panel. According to the present embodiment, the LCD panel is employed as an example.

The display panel 120 is a rectangular plate with long lateral sides and short lateral sides. The display panel 120 includes a first substrate 121, a second substrate 122 facing the first substrate 121, and liquid crystals (not shown) interposed between the first substrate 121 and the second substrate 122. The display panel 120 drives the liquid crystals to display an image on the front portion of the display panel 120. In order to drive the liquid crystals, thin film transistors may be formed on the first substrate 121, and color filters may be formed on the second substrate 122. In this case, the first substrate 121 and the second substrate 122 may be referred to as a thin film transistor substrate and a color filter substrate, respectively.

Since the liquid crystals have a non-emissive property, the light source 160 is necessary to display an image. However, light emitted from the light source 160 includes an undesired vibration vector, so polarizing plates (not shown) are attached to both sides of the display panel 120 such that transmission axes of the polarizing plates cross each other at an angle of 90° to adjust the vibration vector of the light. The polarizing plates polarize the light that has passed through the liquid crystals such that the light has a specific vibration vector. Accordingly, when the light passes through the display panel 120, the intensity of the light is adjusted according to a rotation degree of a polarizing axis, so that the light may be variously expressed from a black color to a white color.

The mold frame 130 is provided along peripheral portions of the display panel 120. The mold frame 130 has a substantially rectangular ring shape. The mold frame 130 supports the display panel 120 and the optical member 140. The mold frame 130 is assembled with the lower cover 180 to receive the optical member 140, the light source 160, and the reflective sheet 170 therein. As shown in FIG. 1, a single mold frame 130 is provided. If necessary, a plurality of mold frames may be provided and assembled with each other.

The optical member 140 controls the direction and intensity of the light output from the light source 160. The optical member 140 includes a protective sheet 141, a prism sheet 143, a diffusion sheet 145, and a light guide plate 147.

The diffusion sheet 145 diffuses the light. The prism sheet 143 collects light, which is diffused by the diffusion sheet 145, in the direction perpendicular to a plane of the display panel 120. Most light that has passed through the prism sheet 143 travels perpendicularly so that uniform brightness distribution is achieved. The protective sheet 141, which is placed at the uppermost portion of the optical member 140, protects the prism sheet 143 from scratches. The light guide plate 147 converts the path of the light output from the light source 160 such that the light is directed to the display panel 120, which will be described later in detail.

The protective sheet 141, the prism sheet 143 and the diffusion sheet 145 can be omitted. In addition, if necessary, a plurality of prism sheets 143 and diffusion sheets 145 can be provided while overlapping each other.

The light source 160 is provided at the side of the optical member 140 to supply the light to the display panel 120 through the optical member 140. The light source 160 may be provided as a plurality of lights. The light source 160 may include a light emitting diode (LED), a cold cathode fluorescence lamp (CCFL), an external electrode fluorescent lamp (EEFL), or a hot cathode fluorescence lamp (HCFL).

The reflective sheet 170 is provided below the light source 160. The reflective sheet 170 reflects light, which travels downward from the light source 160, toward the display panel 120.

As described above, the display panel 120 has a non-emissive property so that the light source 160 is additionally employed to supply light. In this case, the light source 160 is provided at one side, below the display panel 120, so the light guide plate 147 is used to guide the light toward the display panel 120.

The light guide plate 147 not only guides the light of the light source 160 toward the display panel 120, but also scatters the light in the form of point light or linear light so that uniform optical density can be achieved.

Figure 2:
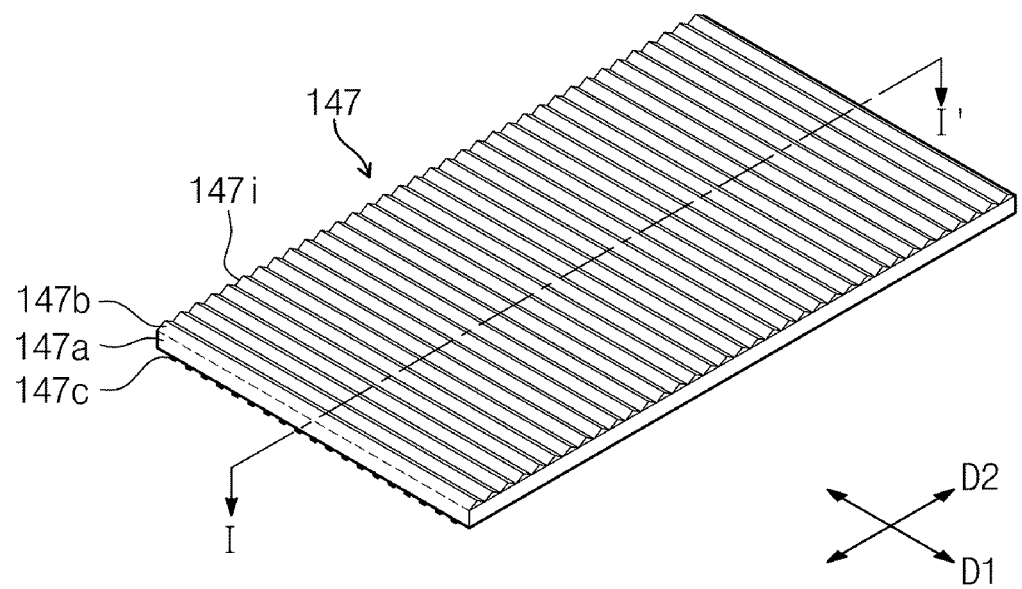
FIG. 2 is a perspective view showing a light guide plate according to the first exemplary embodiment of the present invention.
Figure 3:
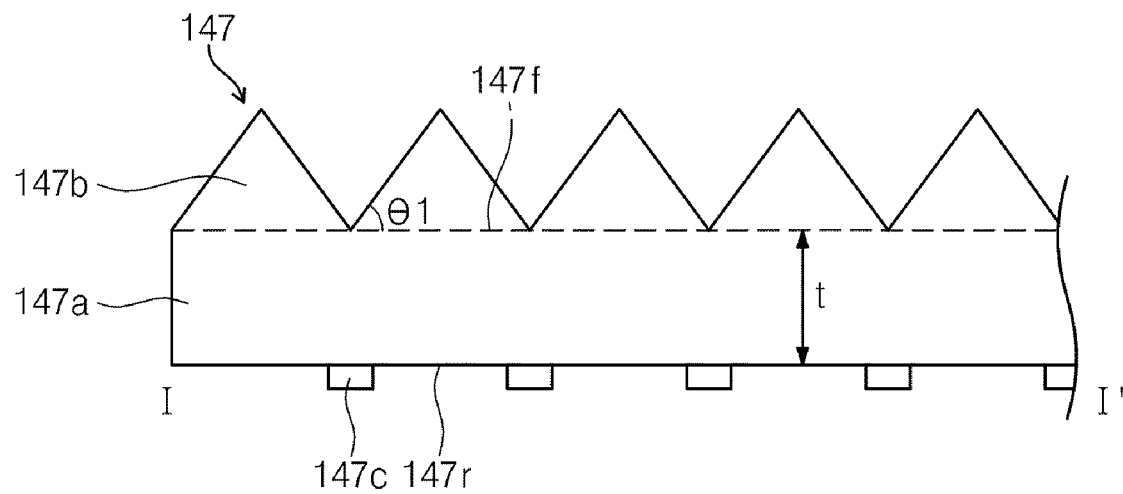
FIG. 3 is a sectional view taken along line I-I' shown in FIG. 2.

FIG. 2 is a perspective view of the light guide plate 147 according to the first exemplary embodiment of the present invention. FIG. 3 is a sectional view taken along line I-I' shown in FIG. 2, and FIG. 4 is a bottom view showing a reflective section of the light guide plate 147.

Figure 4:
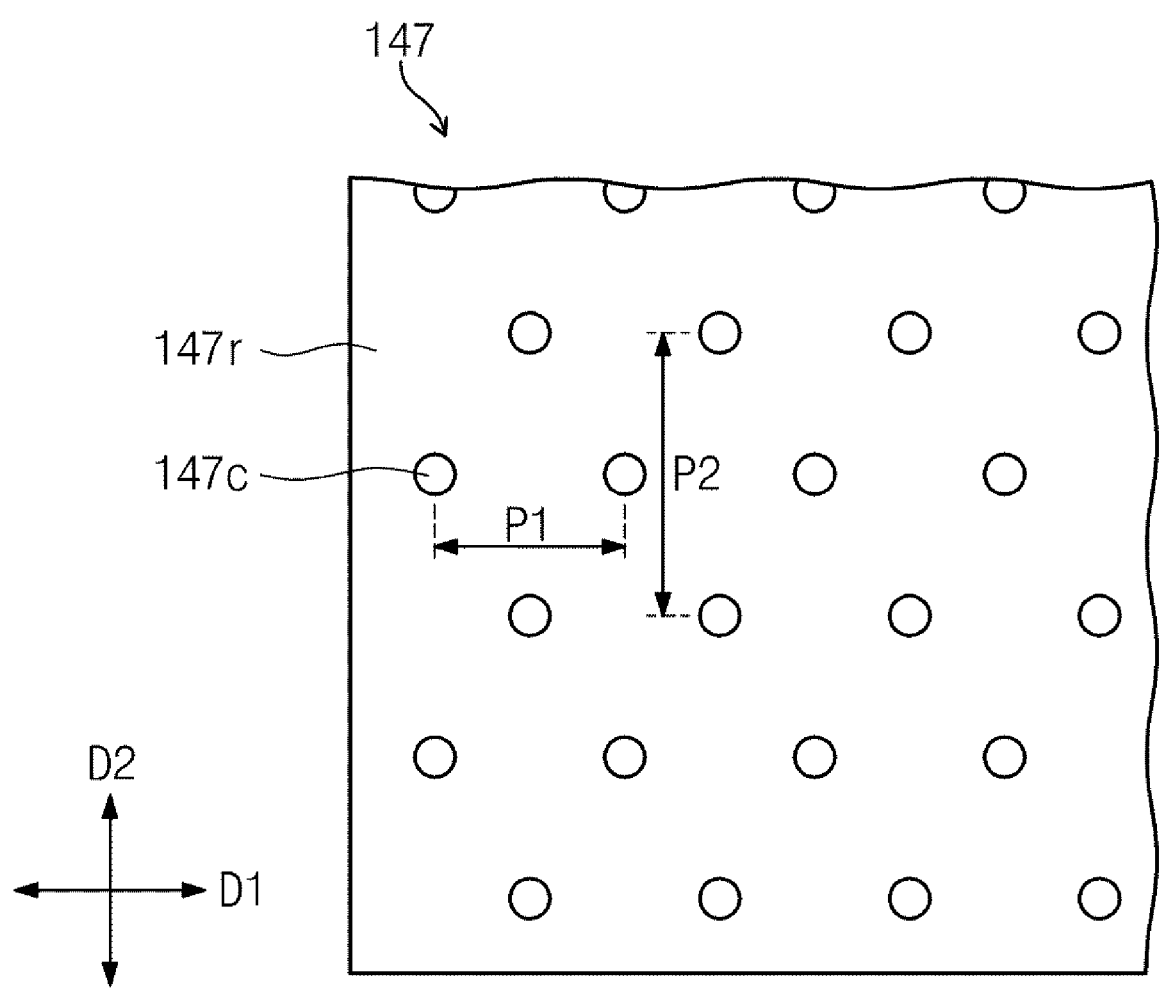
FIG. 4 is a bottom view showing a reflective section of a light guide plate according to the first exemplary embodiment of the present invention.

Referring to FIG. 2, FIG. 3 and FIG. 4, the light guide plate 147 according to the first exemplary embodiment of the present invention includes a base 147a having substantially a plate shape, and a first pattern 147b and a second pattern 147c formed on the base 147a.

The base 147a includes an exit section 147f, a reflective section 147r opposite to the exit section 147f, and a plurality of lateral sides connecting the exit section 147f to the reflective section 147r. A lateral side of the light guide plate 147 adjacent to the light source 160 serves as an incident surface 147i, and the light incident into the incident surface 147i is output through the exit section 147f. The reflective section 147r is disposed in opposition to the exit section 147f. A distance between the exit section 147f and the reflective section 147r corresponds to thickness t of the light guide plate 147.

Referring to FIG. 1, FIG. 2, FIG. 3 and FIG. 4, since the light source 160 is disposed at a side of the light guide plate 147, the light output from the light source is incident into the incident surface 147i. The incident surface 147i is perpendicularly disposed at one end of the exit section 147f and the reflective section 147r. According to the first exemplary embodiment of the present invention, the incident surface 147i forms an angle of 90° with respect to the exit section 147f and the reflective section 147r. However, this angle may be changed according to embodiments.

In the light guide plate 147 having the above structure, the light output from the light source 160 is incident into the incident surface 147i and then reflected and refracted in the base 147a. At the beginning, the light incident into the incident surface 147i travels substantially parallel to or slightly tilted from the exit section 147f and the reflective section 147r. The light is reflected several times by the lateral sides of the light guide plate 147 including the incident surface 147i, the exit section 147f and the reflective section 147r, and then output in the upward direction through the exit section 147f. Otherwise, the light is output in the downward direction of the light guide plate 147 through the reflective section 147r and then incident again into the reflective section 147r while being reflected from the reflective sheet 170 so that the light is output in the upward direction through the exit section 147f.

A plurality of first patterns 147b are formed on the exit section 147f to allow the light to be uniformly output in the direction perpendicular to the exit section 147f.

The first patterns 147b are arranged in the first direction D1, which crosses the incident surface 147i.

The first patterns 147b are integrally formed with the base 147a while protruding upward from the exit section 147f.

According to the first exemplary embodiment, the first patterns 147b are arranged in such a manner that the light output perpendicularly to the exit section 147f may have maximum brightness. To this end, for example, the first patterns 147b have triangular sections protruding in the direction perpendicular to the exit section 147f viewed in cross-section along the first direction D1 (FIG. 3). In this case, the triangular shape may include an isosceles triangle having two sides identical to each other, or a scalene triangle having two sides different from each other.

A plurality of second patterns 147c are formed on the reflective section 147r to reflect and scatter the light, which is incident through the incident surface 147i, at various angles.

The second patterns 147c are spaced part from each other by a predetermined distance. The second patterns 147c may be formed as print patterns. The second patterns 147c may have circular, oval, or polygonal shapes when viewed in the bottom view. According to the first exemplary embodiment of the present invention, the second patterns 147c have the circular shape.

A distance between centers of two adjacent second patterns 147c may depend on the alignment direction of the first patterns 147b. That is, under the conditions that the direction crossing the first direction D1, which is the alignment direction of the first patterns 147b, is defined as the second direction D2, a specific second pattern is defined as a first unit pattern, a second pattern adjacent to the first unit pattern in the first direction D1 at a first interval P1 is defined as a second unit pattern, and second patterns adjacent to the first unit pattern in the second direction D2 while being spaced apart from each other by a second interval P2 are defined as third and fourth unit patterns, the first interval P1 is smaller than the second interval P2.

Although not shown in the drawings, the second unit pattern may be tilted with respect to the first unit pattern in the first direction D1 at an angle of about −5° to about +5°.

The second patterns 147c have different intervals P1 and P2 in the first direction D1 and the second direction D2 in order to reduce dot visibility in the light passing through the light guide plate 147. The term "dot visibility" signifies that a pattern formed on the reflective section 147r of the light guide plate 147 is visible in the light, which is output through the exit section 147f after being reflected from the reflective section 147r. The dot visibility relates to the size of the second patterns 147c and distance between two adjacent second patterns 147c. If the second patterns 147c have the same size, the dot visibility may become severe as the distance between two adjacent second patterns 147c increases.

Figure 5A:
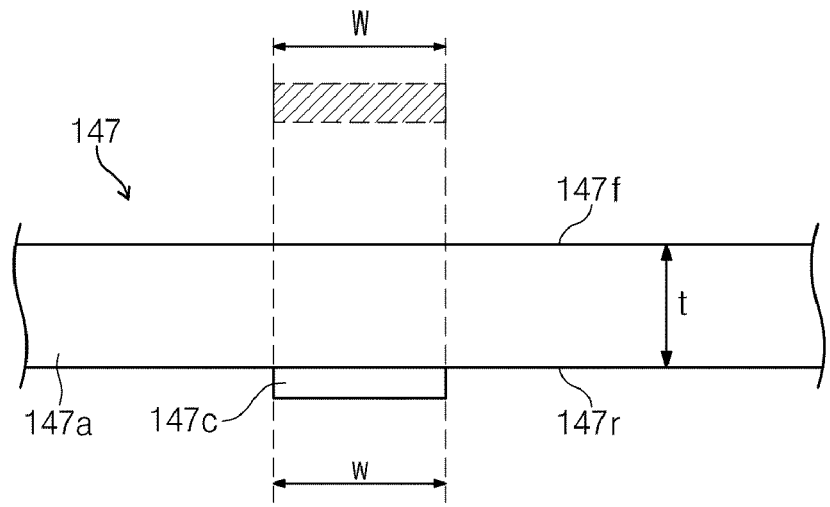
FIG. 5A and FIG. 5B are views schematically showing sectional shapes of a light guide plate.
Figure 5B:
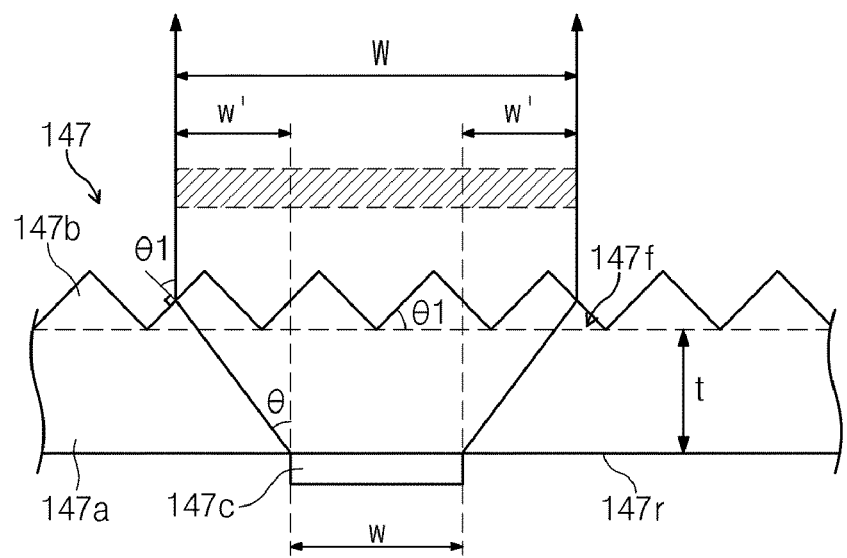
Figure 6A:
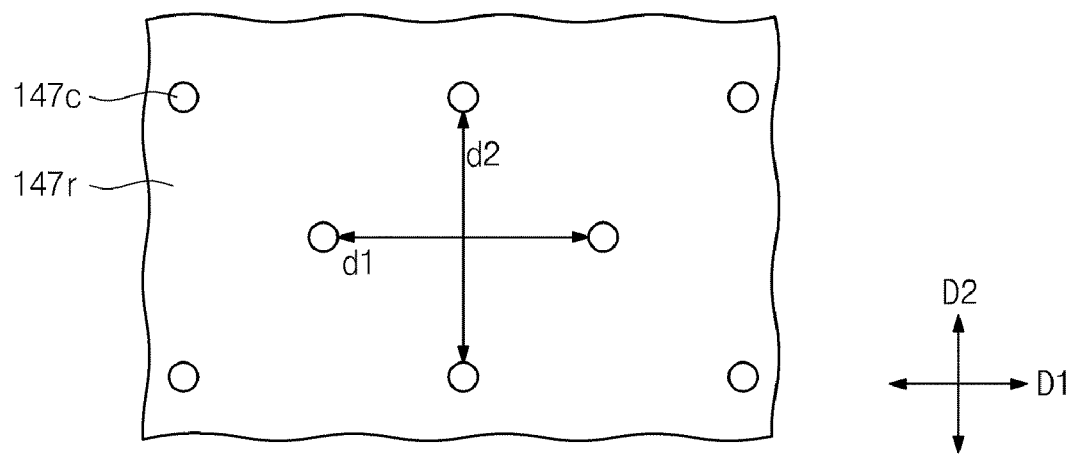
FIG. 6A and FIG. 6B are views showing second patterns which are seen when light is output perpendicularly to an exit surface of a light guide plate.
Figure 6B:
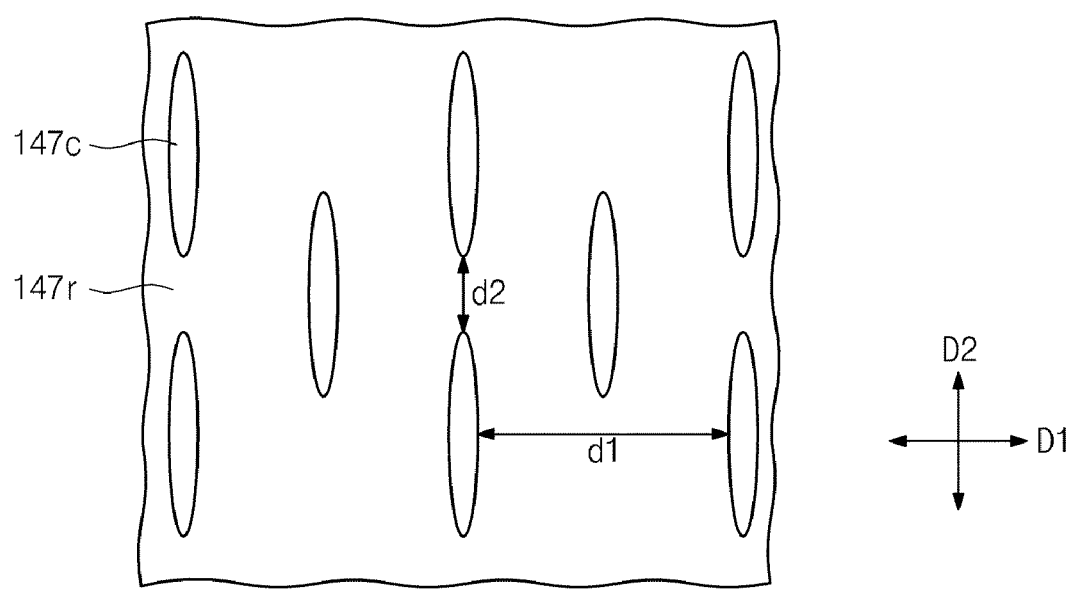

FIG. 5A and FIG. 5B are views schematically showing the sectional shape of the light guide plate 147 to explain the dot visibility, and FIG. 6A and FIG. 6B are views showing the second pattern 147c which is seen when the light is output perpendicularly to the exit section 147f of the light guide plate 147 shown in FIG. 5A and FIG. 5B. The reference numerals used in FIG. 2, FIG. 3 and FIG. 4 will be assigned to the same elements for the purpose of convenience of explanation.

Referring to FIG. 5A, the second patterns 147c having plan circular shapes are formed on the reflective section 147r without forming patterns on the exit section 147f of the light guide plate 147. Referring to FIG. 5B, the first patterns 147b are formed on the exit section 147f, in which the first patterns 147b have triangular sections extending in the direction perpendicular to the incident surface 147i and in the first direction D1, and the second patterns 147c having plan circular shapes are printed on the reflective section 147r. A diameter of each second pattern 147c is represented as w.

In addition, the distance between two second patterns 147c adjacent to each other in the first direction D1 is defined as d1, and the distance between two second patterns 147c adjacent to each other in the second direction D2 is defined as d2, in which the distance d1 is identical to the distance d2. These distances refer to the distance between boundary lines of two adjacent patterns and may be different from the distance between the centers of two adjacent patterns.

Referring to FIG. 5A and FIG. 6A, the exit section 147f has no pattern so that the light traveling perpendicular to the reflective section 147r is output through the exit section 147f without any refraction. Thus, the second patterns 147c having the diameter w and the distances d1 and d2 are visible to the eyes of a user.

Referring to FIG. 5B and FIG. 6B, the light of the light source 160 traveling in the light guide plate 147 passes through the first patterns 147b formed on the exit section 147f before the light reaches the eyes of the user. That is, the light is reflected by the second patterns 147c and refracted by the first patterns 147b as the light is emitted from the light guide plate. However, since the first patterns 147b are arranged in the first direction D1 with the triangular sectional shapes, the light directed to the first patterns 147b from the reflective section 147r is refracted. Due to the refraction of the light, the second patterns 147c are seen as if they are elongated in the second direction D2.

For this reason, although the actual diameter of the second pattern 147c is w, the diameter of the second pattern 147c in the second direction D2 as seen by the user appears to be W. The apparent diameter W of the second pattern 147c as seen by the user may correspond to the sum of the actual diameter w and an increment (2 W') in pattern size visible to the user due to the light refraction by the first pattern 147b.

Under the conditions that the first patterns 147b have the triangular sectional shapes, an angle between a side of the triangle-like shape and the exit section 147f is $\theta_1$, a thickness between the exit section 147f and the reflective section 147r is t, a refractive index of air is $n_{air}$ (=1), and a refractive index of the first pattern 147b is $n_{1st\,pattern}$, the increment in pattern size is about 2 W' that corresponds to about 2·t·tan θ. According to Snell's law, a pattern exit angle θ can be obtained as follows.

$$n_{1st\,pattern} \cdot \sin(\theta_1 - \theta) = n_{air} \cdot \sin \theta_1$$

$$\sin(\theta_1 - \theta) = \sin \theta_1 / n_{1st\,pattern}$$

$$\theta = \theta_1 - \sin^{-1}(\sin \theta_1 / n_{1st\,pattern})$$

Figure 7:
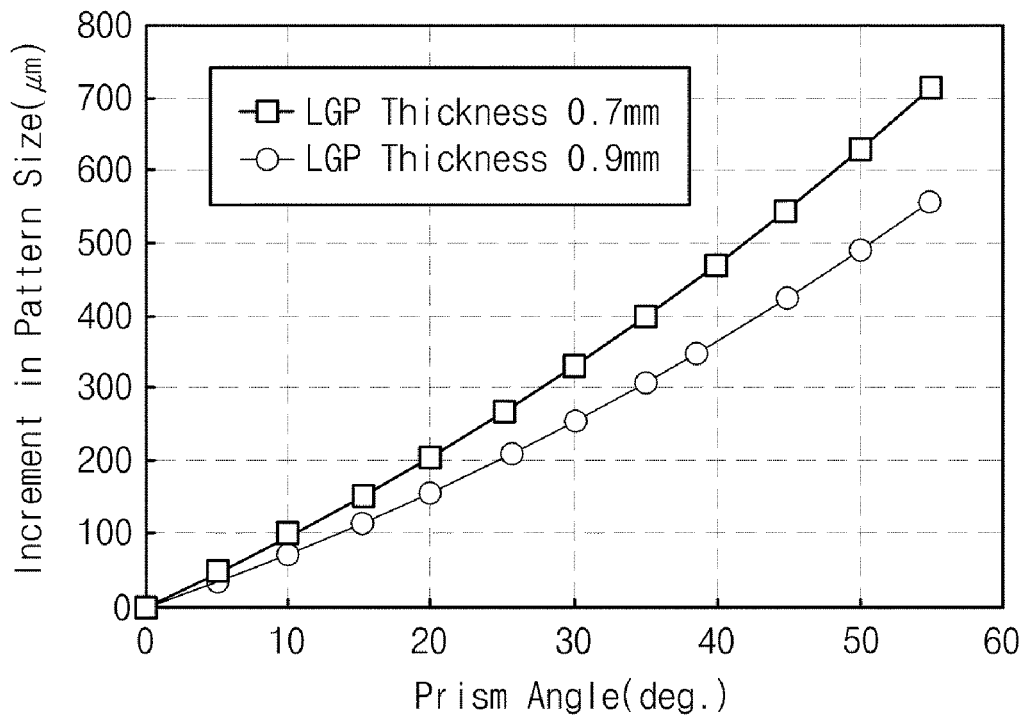
FIG. 7 is a graph showing the increment in pattern size when a first pattern has a triangular sectional shape, an angle between a side of the triangle and an exit surface is θ1, and thickness of a base is t.

FIG. 7 is a graph showing the increment in pattern size visible to the user when the first pattern 147b has the triangular sectional shape, the angle between the side of the triangle-like shape and the exit section 147f is $\theta_1$, and the thickness of the base 147a (that is, the thickness between the exit section 147f and the reflective section 147r) is t. Table 1 shows the graph in terms of numerical values. In Table 1, $\theta_1$ is referred to as prism angle. Two light guide plates are prepared by using polymethylmethacrylate (PMMA), in which the refractive index of the light guide plates is 1.48, and the thickness of the light guide plates is about 0.7 mm and about 0.9 mm, respectively.

TABLE 1

| Prism angle ($\theta_1$) | Pattern exit angle (θ) | Increment in pattern size (μm) (t = 0.7 mm) | Increment in pattern size (μm) (t = 0.9 mm) |
|---|---|---|---|
| 5.00 | 1.65 | 40 | 52 |
| 10.00 | 3.31 | 81 | 104 |
| 15.00 | 5.00 | 122 | 157 |
| 20.00 | 6.73 | 165 | 212 |
| 25.00 | 8.52 | 210 | 270 |
| 30.00 | 10.39 | 257 | 330 |
| 35.00 | 12.36 | 307 | 394 |
| 40.00 | 14.44 | 361 | 464 |
| 45.00 | 16.67 | 419 | 539 |
| 50.00 | 19.06 | 484 | 622 |
| 55.00 | 21.65 | 556 | 714 |

As shown in Table 1, the apparent size of the second pattern 147c visible to the user increased in the direction perpendicular to the alignment direction of the first patterns 147b as the prism angle $\theta_1$ of the first patterns 147b formed on the exit section 147f increased. That is, the distance between the second patterns 147c visible to the user in the first direction D1 is identical to the original distance between the second patterns 147c, but the distance between the second patterns 147c visible to the user in the second direction D2 is smaller than the original distance between the second patterns 147c.

As a result, the dot visibility in the second direction D2 can be reduced when the first patterns 147b extend in the first direction D1. However, since the distance between the second patterns 147c visible to the user in the first direction D1 is identical to the original distance between the second patterns 147c, the dot visibility in the first direction D1 may not be reduced.

In this regard, according to an embodiment of the present invention, the distance between the second patterns 147c is adjusted to reduce the apparent distance between the second patterns 147c visible to the user in the first direction D1, thereby reducing the dot visibility. That is, the first interval P1 is reduced and the second interval P2 is increased to correct the shape of the patterns visible to the user, thereby reducing the dot visibility.

When the shape of the patterns is corrected by reducing the first interval P1 and increasing the second interval P2, the first interval P1 may be reduced within the range of the increment in pattern size, and the second interval P2 may be increased within the range of the increment in pattern size. Therefore, according to the first exemplary embodiment of the present invention, when the increment in pattern size is α, the first interval P1 has the value of x−α, and the second interval P2 has the value of x+α (x>α, 0<α≦2·t·tan θ, $\theta = \theta_1 - \sin^{-1}(\sin \theta_1 / n_{1st\,pattern})$), in which x is greater than α.

Therefore, the interval in the alignment direction of the first patterns 147b is corrected to be smaller than the interval in the direction perpendicular to the alignment direction of the first patterns 147b, and the difference between intervals in the first direction D1 and the second direction D2 is about two times (2α) greater than the increment in pattern size.

Figure 8:
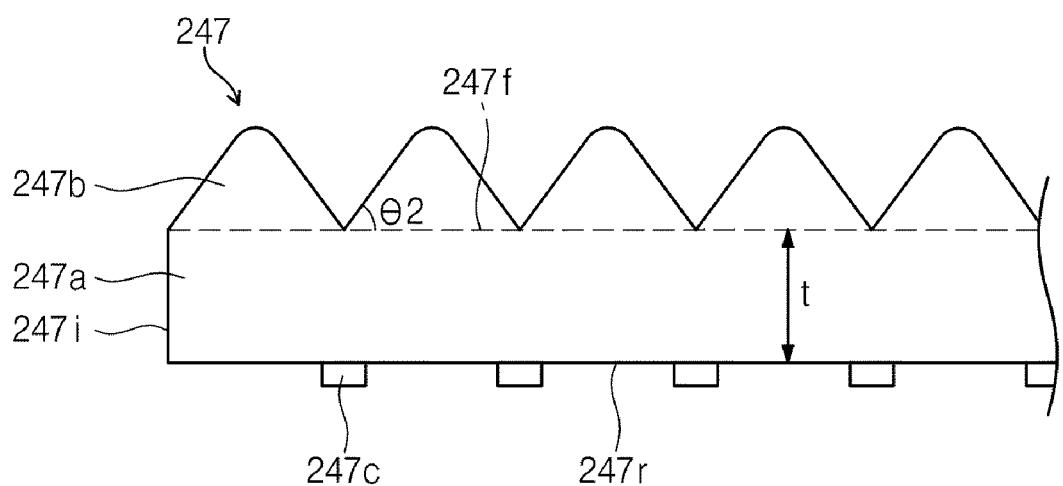
FIG. 8 is a sectional view showing a light guide plate according to a second exemplary embodiment of the present invention.
Figure 9:
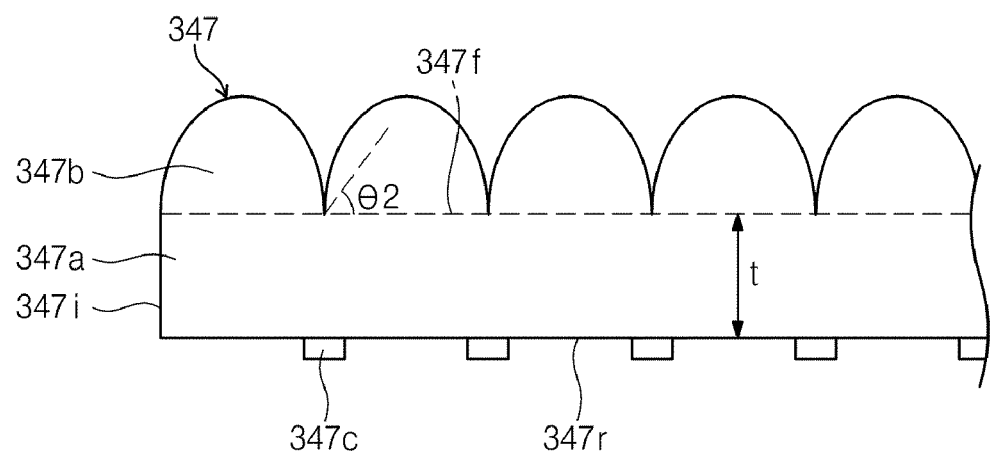
FIG. 9 is a sectional view showing a light guide plate according to a third exemplary embodiment of the present invention.

FIG. 8 is a sectional view showing a light guide plate 247 according to the second exemplary embodiment of the present invention, in which a first pattern 247b has a triangle-like shape, and FIG. 9 is a sectional view showing a light guide plate 347 according to the third exemplary embodiment of the present invention, in which a first pattern 347b has a sectional shape in the form of a segment of a circle. Although the second and third exemplary embodiments of the present invention show the first pattern 147b having the sectional shapes of the triangle-like shape and the segment of the circle, the first pattern 147b may have various sectional shapes. For instance, the first pattern 147b may have a polygonal shape, a polygonal shape with curved lateral sides, or a semicircular shape.

FIG. 8 and FIG. 9 are corresponding to FIG. 3, which is a sectional view taken is along line I-I' of FIG. 2, so the following description will be focused on differences with respect to the first exemplary embodiment in order to avoid redundancy and the same reference numerals will be assigned to the same elements.

As shown in FIG. 8 and FIG. 9, the light guide plates 247 and 347 according to the second exemplary embodiment and the third exemplary embodiment of the present invention include bases 247a and 347a having first patterns 247b and 347b and second patterns 247c and 347c formed on the bases 247a and 347a, respectively. The light guide plates 247 and 347 also include incident surfaces 247*i* and 347*i*, exit sections 247*f* and 347*f*, and reflective sections 247*r* and 347*r*, respectively. The distances between the exit sections 247*f* and 347*f* and the reflective sections 247*r* and 347*r* correspond to thicknesses t of the light guide plates 247 and 347, respectively.

The exit sections 247*f* and 347*f* are formed with a plurality of first patterns 247*b* and 347*b* thereon to allow the light, which is incident through the incident surfaces 247*i* and 347*i*, to be output in the direction perpendicular to the exit sections 247*f* and 347*f*. The first patterns 247*b* and 347*b* are arranged in the first direction D1 which is perpendicular to the incident surface 247*i* and 347*i*. The first patterns 247*b* and 347*b* are integrally formed with the bases 247*a* and 347*a* while protruding upward from the exit sections 247*f* and 347*f*.

Referring to FIG. 8, the first pattern 247*b* has a triangular section protruding in the direction perpendicular to the exit section 247*f* viewed in cross-section along the first direction D1. The term "triangular sectional shape" signifies the triangle-like shape having a curved top vertex. The sides of the triangle-like shape connecting the exit section 247*f* to the curved top vertex are prepared as straight lines except for the region of the curved top vertex.

Referring to FIG. 9, the first pattern 347*b* has a sectional shape in the form of a segment of a circle protruding in the direction perpendicular to the exit section 347*f* viewed in cross-section along the first direction D1. The term "segment of circle" signifies a figure consisting of an arc of a circle and a chord connecting both ends of the arc, which is also called a crescent form. When the first patterns 247*b* and 347*b* have sectional shapes of the substantial triangle or the segment of the circle, the light traveling upward perpendicularly to the exit sections 247*f* and 347*f* of the light guide plates 247 and 347 is easily reflected by the first patterns 247*b* and 347*b*, so that a portion of the light directly output in the upward direction is reduced. In addition, the light traveling upward while being slightly tilted with respect to the exit sections 247*f* and 347*f* is reflected and refracted by the first patterns 247*b* and 347*b*, so that a portion of the light perpendicularly output in the upward direction is increased. Therefore, the uniformity of the light output from the light guide plates 247 and 347 can be improved.

However, according to the second exemplary embodiment and the third exemplary embodiment, the first patterns 247*b* and 347*b* are arranged in the first direction D 1 similar to the first embodiment, so that the dot visibility may occur. Thus, when forming the second patterns 247*c* and 347*c* on the reflective sections 247*r* and 347*r*, the first interval P1 of the second patterns 247*c* and 347*c* is set differently from the second interval P2 of the second patterns 247*c* and 347*c* similar to the first embodiment.

Referring to FIG. 8, under the conditions that an angle between a side of the substantial triangle and the exit section 247*f* is $\theta_2$, a thickness of the base 247*a* of the light guide plate 247 is t, and a refractive index of the first pattern 247*b* is $n_{1st\,pattern}$, the first interval P1 has a value of x−α, and the second interval P2 has a value of x+α (x>α, 0<α≦2·t·tan θ, $\theta = \theta_1 - \sin^{-1}(\sin\theta_1/n_{1st\,pattern})$).

Referring to FIG. 9, under the conditions that an angle between a straight line connecting an uppermost point of the circle with one end of the arc and the exit section 347*f* is $\theta_2$, a thickness between the exit section 347*f* and the reflective section 347*r* is t, and a refractive index of the first pattern 347*b* is $n_{1st\,pattern}$, the first interval P1 has a value of x−α, and the second interval P2 has a value of x+α (x>α, 0<α≦2·t·tan θ, $\theta = \theta_1 - \sin^{-1}(\sin\theta_1/n_{1st\,pattern})$).

Figure 10:
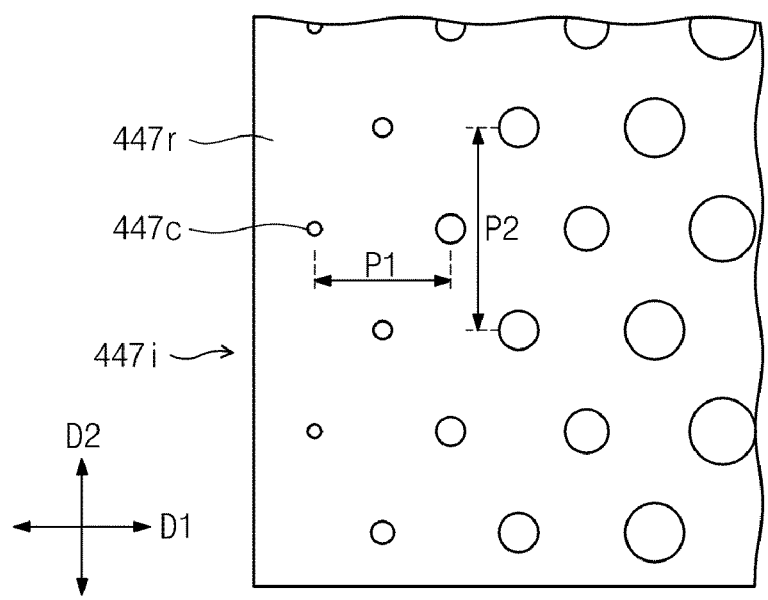
FIG. 10 is a bottom view showing a light guide plate according to a fourth exemplary embodiment of the present invention, in which second patterns are formed on a reflective section.

FIG. 10 is a bottom view showing a second pattern formed on a reflective section of a light guide plate according to the fourth exemplary embodiment of the present invention, in which the size or density of the second pattern varies depending on the distance from the incident surface. The following description about the fourth exemplary embodiment will be focused on differences with respect to the first exemplary embodiment in order to avoid redundancy and the same reference numerals will be assigned to the same elements.

Referring to FIG. 10, second patterns 447*c* formed on a reflective section 447*r* have an area that is gradually increased as the second patterns 447*c* are disposed farther from an incident surface 447*i* connected to one end of the reflective section 447*r*. For instance, if the second patterns 447*c* have circular plan shapes, the diameter of the circle increases as the second patterns 447*c* are disposed farther away (remote) from the incident surface 447*i*. That is, when a portion of the reflective section 447*r* close to the incident surface 447*i* is defined as an incident section, a portion of the reflective section 447*r* opposite to the incident section is defined as an opposite section, and a portion of the reflective section 447*r* located between the incident section and the opposite section is defined as a central section, the area of the second patterns 447*c* is gradually increased from the incident section to the opposite section. Thus, the second patterns 447*c* may be distributed with high density in a predetermined unit area of the reflective section.

The second patterns 447*c* are formed on the reflective section 447*r* with various sizes, thereby compensating for reduction of light quantity, which is lowered as the distance from the incident surface 447*i* is increased, in the base 147*a* of the light guide plate 147. Since the second patterns 447*c* may be distributed at a higher density the farther away (remote) they are from the incident surface 447*i*, the proportion of light reflected from the reflective section 447*r* may be sequentially increased. In addition, although not shown in the drawings, the first interval P1 or the second interval P2 in the second pattern 447*c* may be increased or reduced according to the distance from the incident surface 447*i*. Thus, uniformity of the light traveling in the upward direction may be improved over the whole area of the light guide plate 147.

Figure 11:
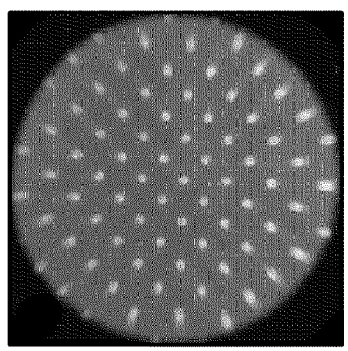
FIG. 11 is a photographic view showing dot visibility when a conventional light guide plate and a guide light plate according to an exemplary embodiment of the present invention are employed.
Figure 11:
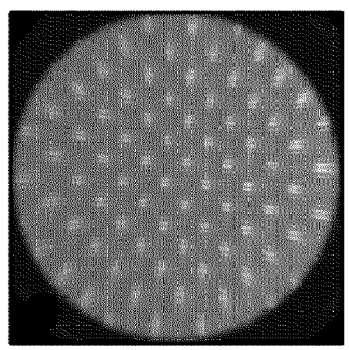
Figure 11:
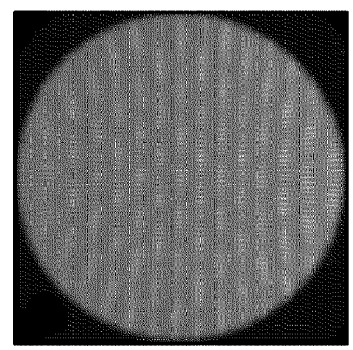
Figure 11:
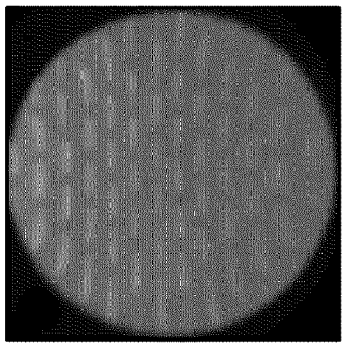
Figure 11:
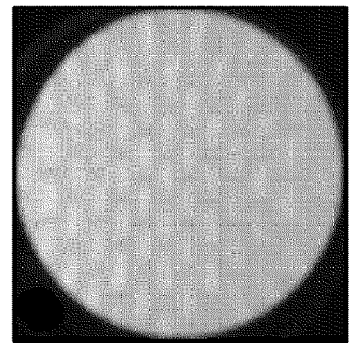
Figure 11:
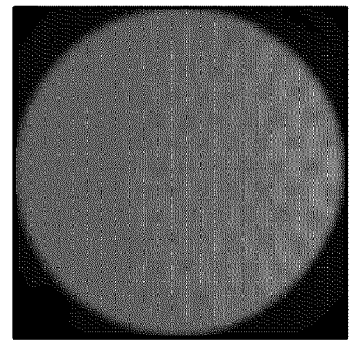

FIG. 11 is a photographic view showing the dot visibility when a conventional light guide plate and the guide light plate 147 according to the first exemplary embodiment of the present invention are employed. The light guide plate 147 manufactured by using PMMA is employed for the cases of (a) to (f) of FIG. 11 and the base 147*a* of the light guide plate 147 has a thickness of about 0.7 mm. For the purpose of convenience, reference numerals used in the first exemplary embodiment will be adopted in the following description.

In FIG. 11, (a) represents the second patterns 147*c* formed on the reflective section 147*r*. The second patterns 147*c* have circular sections with the diameter of about 180 μm and the first and second intervals P1 and P2 are set to about 680 μm. The exit section 147*f* has no pattern.

In FIG. 11, (b) represents the first patterns 147*b* having triangular sections protruding in the direction perpendicular to the exit section 147*f* and extending along the first direction D1. The triangle has a height of about 12 μm and a base line of about 80 μm which makes contact with the exit section 147*f*. The reflective section 147*r* is formed with the second patterns 147*c* thereon having plan circular shapes with a diameter of about 180 μm, in which the first interval P1 and the second interval P2 are set to about 680 μm.

In FIG. 11, (c) represents the first patterns 147*b* having sectional shapes in the form of a segment of a circle protruding in the direction perpendicular to the exit section 147*f* and extending along the first direction D1. The segment of the circle has a height of about 24 μm and a chord connected to the exit section 147f has a length of about 80 μm. The reflective section 147r is formed with the second patterns 147c thereon having circular plan shapes with a diameter of about 180 μm, in which the first interval P1 and the second interval P2 are set to about 680 μm.

In FIG. 11, (d) represents the first patterns 147b having triangle-like sections protruding in the direction perpendicular to the exit section 147f and extending along the first direction D1. The triangle-like section has a height of about 12 μm which is measured from the exit section 147f to the top vertex of the triangle-like shape and a chord connected to the exit section 147f has a length of about 50 μm. The reflective section 147r is formed with the second patterns 147c thereon having circular plan shapes with a diameter of about 180 μm, in which the first interval P1 and the second interval P2 are set to about 680 μm.

In FIG. 11, (e) represents the first patterns 147b having triangle-like sections protruding in the direction perpendicular to the exit section 147f and extending along the first direction D1. The triangle-like section has a height of about 12 μm which is measured from the exit section 147f to the top vertex of the triangle-like shape and a chord connected to the exit section 147f has a length of about 50 μm. The reflective section 147r is formed with the second patterns 147c thereon having circular plan shapes with a diameter of about 220 μm, in which the first interval P1 and the second interval P2 are set to about 680 μm.

In FIG. 11, (f) represents the first patterns 147b having triangle-like sections protruding in the direction perpendicular to the exit section 147f and extending along the first direction D1. The triangle-like section has a height of about 12 μm which is measured from the exit section 147f to the top vertex of the triangle-like shape and a chord connected to the exit section 147f has a length of about 50 μm. The reflective section 147r is formed with the second patterns 147c thereon having circular plan shapes with a diameter of about 220 μm, in which the first interval P1 is set to about 550 μm and the second interval P2 is set to about 850 μm.

Referring to FIG. 11, in the case of (a) having no first patterns 147b, the dot visibility is severely represented. In the cases of (b) to (d) having the first patterns 147b and the second patterns 147c in which the first interval P1 is identical to the second interval P2, the pattern size is increased in the second direction D2 so that the dot visibility in the second direction D2 is reduced as compared with the case (a), but the second patterns 147c are still visible to the user. In contrast, in the cases of (e) and (f), the dot visibility is remarkably reduced as compared with the cases (a) to (d).

Figure 12:
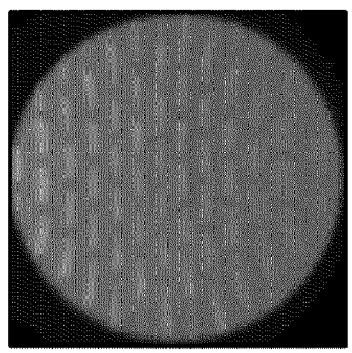
FIG. 12 is a photographic view showing dot visibility when a first interval is identical to or different from a second interval in second patterns of a light guide plate.
Figure 12:
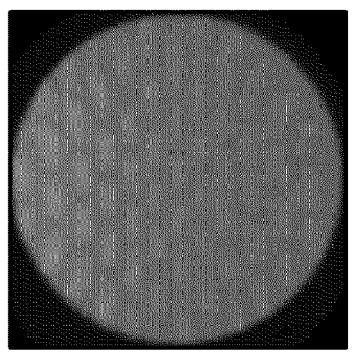
Figure 12:
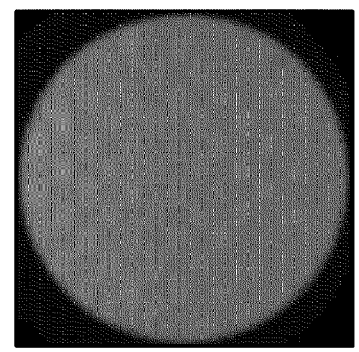
Figure 12:
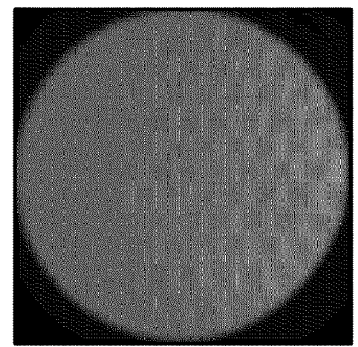
Figure 12:
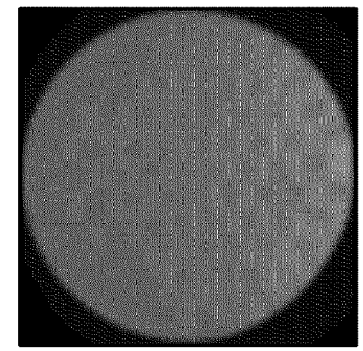
Figure 12:
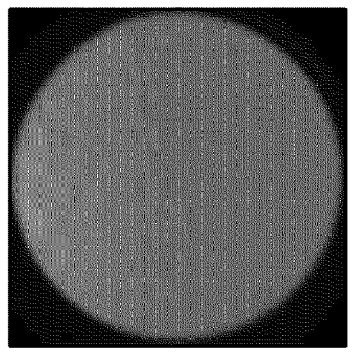

FIG. 12 is a photographic view showing the dot visibility when the first interval P1 is identical to or smaller than the second interval P2 in the second patterns 147c of the light guide plate 147.

For the purpose of convenience, reference numerals used in the first embodiment will be adopted in the following description.

The light guide plate 147 manufactured by using PMMA is employed for the cases of (a) to (f) of FIG. 12 and the base 147a of the light guide plate 147 has a thickness of about 0.7 mm. In FIG. 12, the size of the second patterns 147c in the incident section, the central section, and the opposite section of the reflective section 147r of the light guide plate 147 is increased from about 180 μm, to about 270 μm, and to about 360 μm, respectively.

In FIG. 12, (a), (b) and (c) represent the first patterns 147b having triangle-like sections protruding in the direction perpendicular to the exit section 147f and extending along the first direction D1. The triangle-like section has a height of about 12 μm which is measured from the exit section 147f to the top vertex of the triangle-like shape and a chord connected to the exit section 147f has a length of about 50 μm. In these cases, the angle $\theta_1$ is about 36°. The reflective section 147r is formed with the second patterns 147c thereon having circular plan shapes with diameters of 180 μm ((a) of FIG. 12), 270 μm ((b) of FIG. 12), and 360 μm ((c) of FIG. 12), in which the first interval P1 and the second interval P2 are set to about 680 μm.

In FIG. 12, (d), (e) and (f) represent the first patterns 147b having triangle-like sections protruding in the direction perpendicular to the exit section 147f and extending along the first direction D1. The triangle-like section has a height of about 12 μm which is measured from the exit section 147f to the top vertex of the triangle-like shape and a chord connected to the exit section 147f has a length of about 50 μm. In these cases, the angle $\theta_1$ is about 36°. The reflective section 147r is formed with the second patterns 147c thereon having circular plan shapes with diameters of 180 μm ((d) of FIG. 12), 270 μm ((e) of FIG. 12), and 360 μm ((f) of FIG. 12), in which the first interval P1 is set to about 550 μm and the second interval P2 is set to about 850 μm.

When comparing the cases (a), (b) and (c) with the cases (d), (e) and (f) under the same ambient environment, the dot visibility is remarkably reduced when the first interval P1 and the second interval P2 are different from each other.

As described above, in the light guide plate 147 according to the exemplary embodiments of the present invention, the second patterns 147c are formed on the reflective section 147r with different first intervals P1 and second intervals P2 according to the first patterns 147b of the exit section 147f, so that the dot visibility can be reduced and the light can be uniformly output in the upward direction of the light guide plate 147. In addition, the display apparatus 100 including the light guide plate 147 according to exemplary embodiments of the present invention can uniformly supply the light to the display panel 100, so that the display quality can be improved.

The present invention provides a method of manufacturing the light guide plate 147. According to one exemplary embodiment of the present invention, in order to manufacture the light guide plate 147, the first patterns 147b arranged in the first direction D1, which is perpendicular to the incident surface 147i, are formed on the exit section 147f. The first patterns 147b can be integrally formed with the base 147a of the light guide plate 147 through extrusion or injection molding.

Figure 13:
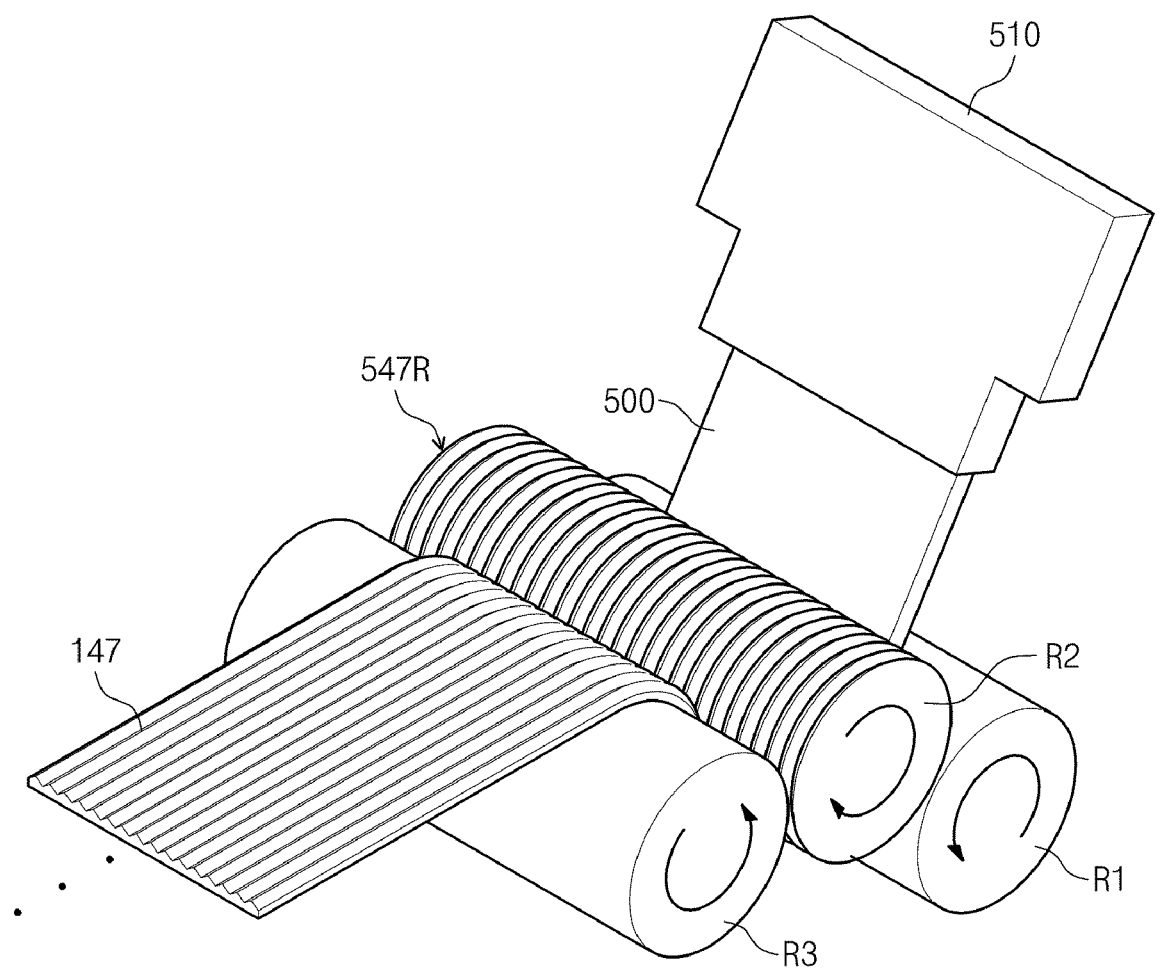
FIG. 13 is a schematic perspective view showing a light guide plate being manufactured by an extruder.

FIG. 13 is a schematic perspective view showing an exemplary embodiment of the light guide plate 147 being manufactured by an extruder.

Referring to FIG. 13, the extruder includes a feeder 510 that feeds molten polymer resin 500 and rollers. The rollers are divided into a first roller R1, a second roller R2 and a third roller R3. The first roller R1 engages with the second roller R2 to press the molten polymer resin 500 into a plate shape. The third roller R3 engages with the second roller R2 to change the traveling direction of the molten polymer resin 500 through the rotation of the third roller R3.

The first roller R1 is provided with predetermined patterns (not shown) to form concave-convex patterns on the surface of the molten polymer resin 500 that makes contact with the first roller R1 being rotated.

The second roller R2 is formed on the surface thereof with concave sections 547R to form convex sections on the surface of the molten polymer resin 500 that makes contact with the second roller R2 when the second roller R2 rotates together with the first roller R1. The concave sections 547R extend along the rotating axis of the second roller R2 and have shapes opposite to the shapes of the convex sections to be formed.

Therefore, when the second roller R2 rotates, the concave sections 547R make contact with the top surface of the polymer resin 500, so that a plurality of convex sections are transferred on the top surface of the polymer resin 500, thereby forming a plurality of first patterns on the top surface of the polymer resin 500. When the polymer resin 500 has passed through the first roller R1, the second roller R2 and the third roller R3, the light guide plate 147 formed on the top surface thereof with the first patterns 147b can be manufactured.

After forming the first patterns 147b on the light guide plate 147, a plurality of second patterns 147c are printed on the reflective section 147r of the light guide plate 147 in such a manner that the second patterns 147c have a first interval P1 in the first direction D1 and a second interval P2 greater than the first interval P1 in the second direction D2. The second patterns 147c can be formed through inkjet printing, roll printing, or hot stamping.

Meanwhile, the first patterns 147b and the second patterns 147c can be formed through a single process. That is, the second patterns 147c can be directly printed on the reflective section 147r of the light guide plate 147 after the first patterns 147b are formed on the light guide plate 147 through the first roller R1, the second roller R2 and the third roller R3.

Since the second patterns 147c can be simply formed through the printing scheme, the manufacturing cost can be reduced and the process time can be shortened.

As mentioned above, the light guide plate 147 according to the exemplary embodiments of the present invention can effectively change the light path while improving uniformity of the light output through the exit section 147f.

According to the exemplary embodiments of the display apparatus 100 employing the light guide plate 147, the light path can be effectively changed and light uniformity can be improved, so that the display quality of the display apparatus 100 can be improved.

Although the exemplary embodiments of the present invention have been described, it will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A light guide plate, comprising:
an incident surface to receive incident light from a light source;
an exit section to output exit light having a light distribution different from a light distribution of the incident light;
a reflective section opposite to the exit section;
a plurality of first patterns disposed on the exit section and arranged in a first direction to distribute the exit light with maximum brightness in a direction perpendicular to the exit section;
and a plurality of second patterns disposed on the reflective section to scatter the incident light,
wherein the second patterns comprise:
a first unit pattern,
a second unit pattern adjacent to the first unit pattern in the first direction and at a first interval, and
a third unit pattern and a fourth unit pattern adjacent to the first unit pattern, wherein the third unit pattern and the fourth unit pattern are spaced apart from each other by a second interval in a second direction that crosses the first direction, and wherein the first interval is smaller than the second interval,
wherein each first pattern comprises a triangle-like shape in a view taken along a plane in a direction perpendicular to the exit section and perpendicular to the first direction, an angle between a side of the triangle-like shape and the exit section is $\theta_1$, a thickness between the exit section and the reflective section is t, a refractive index of each first pattern is $n_{1st\,pattern}$, the first interval has a value of $x+\alpha$, and the second interval has a value of $x+\alpha$, wherein $x>\alpha$, $0<\alpha 2\cdot t\cdot \tan\theta$, $\theta=\theta_1-\sin^{-1}(\sin\theta_1/n_{1st\,pattern})$.

2. The light guide plate of claim 1, wherein the triangle-like shape comprises an isosceles triangle or a scalene triangle.

3. The light guide plate of claim 2, wherein the triangle-like shape has a rounded top vertex protruded from the exit surface.

4. The light guide plate of claim 1, wherein the second unit pattern is tilted with respect to the first unit pattern in the first direction at an angle of about −5° to about +5°.

5. The light guide plate of claim 1, wherein each second pattern comprises a print pattern, and the print pattern comprises one of a circular shape, an oval shape and a polygonal shape when viewed in a plan view.

6. The light guide plate of claim 1, wherein the incident surface is connected perpendicularly to one end of the exit section.

7. The light guide plate of claim 1, wherein an area of a first second pattern disposed adjacent to the incident surface is less than an area of a second pattern, the second pattern being disposed farther away from the incident surface than the first second pattern.

8. The light guide plate of claim 7, wherein the first interval between the second patterns adjacent to the incident surface does not equal the first interval between the second patterns farther away from the incident surface.

9. The light guide plate of claim 7, wherein the second interval between the second patterns adjacent to the incident surface does not equal the second interval between the second patterns farther away from the incident surface.

10. The light guide plate of claim 1, wherein the first patterns protrude outward from the exit section and comprise cross-sections comprising at least one of a semicircular shape, a shape of a segment of a circle, a half-oval shape, a shape of a segment of an oval, and a polygonal shape in a view taken along a plane in a direction perpendicular to the exit section and perpendicular to the first direction.

11. The light guide plate of claim 1, wherein the first patterns comprise extrusion or injection molding patterns.

12. The light guide plate of claim 11, wherein the second patterns comprise printed patterns.

13. The light guide plate of claim 12, wherein the second patterns comprise one of inkjet printed patterns, roll printed patterns and hot stamped patterns.

14. The light guide plate of claim 12, wherein the first patterns and the second patterns comprise patterns formed through a single process.

15. A light guide plate, comprising:
an incident surface to receive incident light from a light source;
an exit section to output exit light having a light distribution different from a light distribution of the incident light;
a reflective section opposite to the exit section;
a plurality of first patterns disposed on the exit section and arranged in a first direction to distribute the exit light with maximum brightness in a direction perpendicular to the exit section; and
a plurality of second patterns disposed on the reflective section to scatter the incident light, wherein the second patterns comprise:
a first unit pattern,
a second unit pattern adjacent to the first unit pattern in the first direction and at a first interval, and
a third unit pattern and a fourth unit pattern adjacent to the first unit pattern, wherein the third unit pattern and the fourth unit pattern are spaced apart from each other by a second interval in a second direction that crosses the first direction, and wherein the first interval is smaller than the second interval,
wherein each first pattern comprises a segment of a circle shape in a view taken along a plane in a direction perpendicular to the exit section and perpendicular to the first direction, an angle between a straight line, which connects an uppermost point of the circle with one end of a chord of the circle, and the exit section is $\theta_2$, a thickness between the exit section and the reflective section is t, a refractive index of each first pattern is $n_{1st\,pattern}$, the first interval has a value of x+α, and the second interval has a value of x+α, wherein x>α, 0<α2·t·tan θ, $\theta=\theta_2-\sin^{-1}(\sin\theta_2/n_{1st\,pattern})$.

* * * * *